(No Model.)

I. N. FICKES.
CORN HARVESTER.

No. 487,558. Patented Dec. 6, 1892.

Witnesses:

Inventor:
Isaac N. Fickes.
By Edson Bros
Atty's.

UNITED STATES PATENT OFFICE.

ISAAC N. FICKES, OF HOLLAND, KANSAS.

CORN-HARVESTER.

SPECIFICATION forming part of Letters Patent No. 487,558, dated December 6, 1892.

Application filed May 9, 1892. Serial No. 432,336. (No model.)

*To all whom it may concern:*

Be it known that I, ISAAC N. FICKES, a citizen of the United States, residing at Holland, in the county of Dickinson and State of Kansas, have invented certain new and useful Improvements in Corn-Harvesters; and I do hereby declare the following to be a full, clear, and exact description of the invention, such as will enable others skilled in the art to which it appertains to make and use the same.

My invention relates to improvements in corn-harvesters; and the object is to compact and guide the cornstalks to the cutting device and to enable the cutting-blade to be adjusted vertically to cut the stalk at any desired height from the ground.

With these ends in view my invention consists of the combination, with a suitable carriage, of a cutter-bar adjustably connected to a suitable standard or upright thereon, a spring-pressed guiding-finger carried on the cutter-bar in advance of the cutter, and a cutting-blade rigidly attached to said cutting-bar.

My invention further consists in the peculiar construction and arrangement of parts, as will be hereinafter more fully described and claimed.

Figure 1:
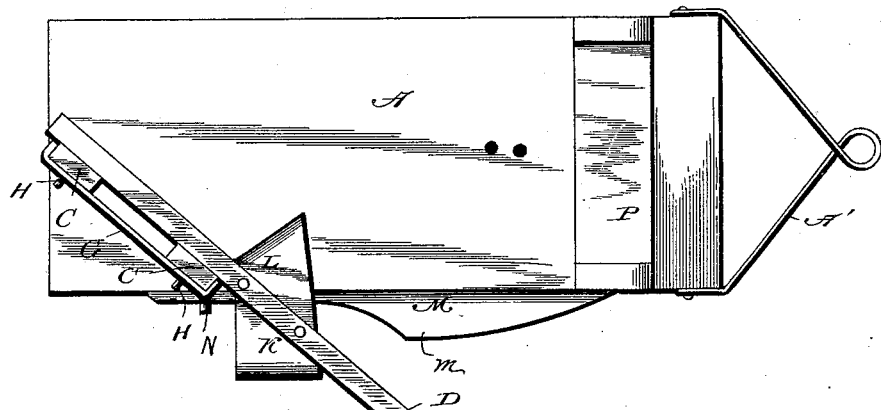
Figure 2:
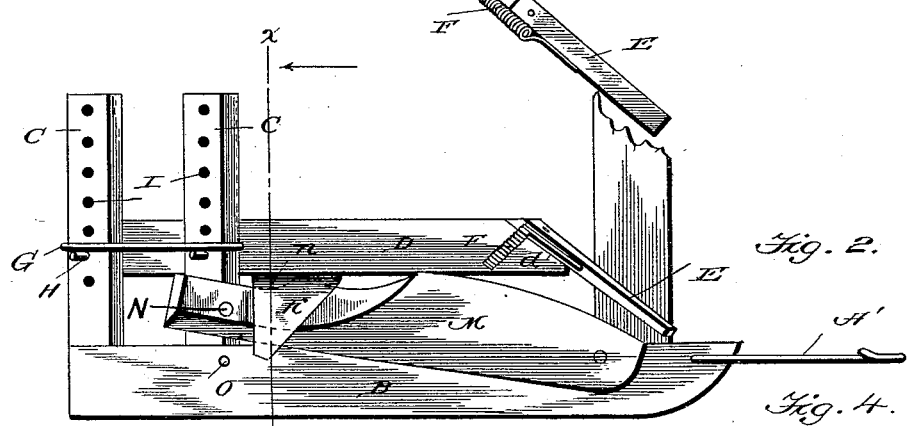
Figure 3:
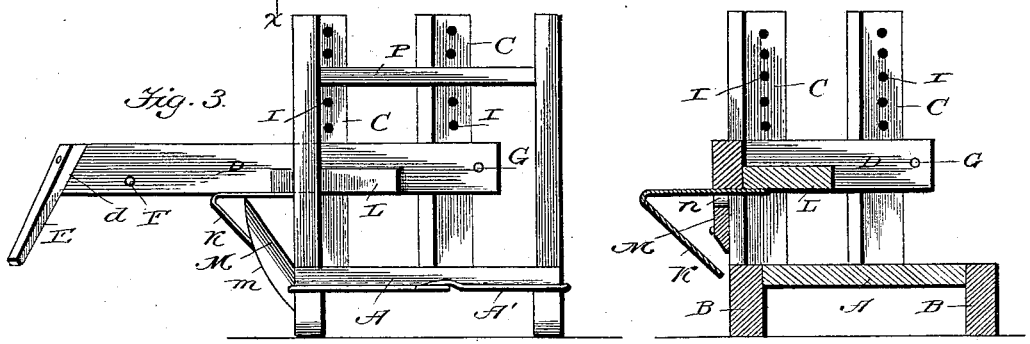
Figure 4:
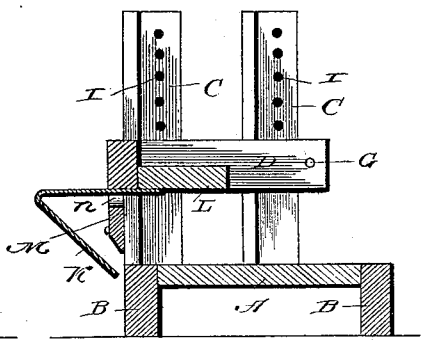

In the accompanying drawings, Figure 1 is a plan view of a corn-harvester constructed in accordance with my invention. Fig. 2 is a side elevation of the same. Fig. 3 is a front view, and Fig. 4 is a vertical sectional view on the line $x\ x$ of Fig. 2.

Like letters of reference denote corresponding parts in the several figures of the drawings, referring to which—

A designates the platform or carriage of the machine, which is shown as mounted on runners B, and is provided at its front end with a bail A' or other draft means to receive a whiffletree. (Not shown.) If desired, wheels may be substituted for the runners B. To said platform or carriage A, near the rear end thereof, are rigidly secured two parallel uprights or standards C C, which are arranged in a line extending diagonally across the platform A, and on said parallel standards or upright C is mounted a horizontal cutter-bar D, which extends or projects forward and beyond one side of the platform A. The outer extremity of the cutter-bar is inclined, as at *d*, and to this inclined end of the cutter-bar D is pivoted a guide-finger E, which finger extends forward beyond the cutter-bar and downwardly below the same. This finger is held normally in line with the cutter-bar by a coiled spring F, one end of which is attached to the rear side of the cutter-bar D near its forward end, and the other end of said spring is attached to the finger E. The spring F keeps the finger E normally in line with the cutter-bar D, and it also serves to return the finger E to its normal position when it is turned rearwardly on its pivot by contact with any solid body or obstruction as the machine is moving forward.

The cutter-bar is preferably secured on the uprights or standards C by means of a keeper G, the ends of which are rigidly attached to the cutter-bar D, and which extend around the uprights C, and said keeper and its attached cutter-bar are secured at any desired point on the uprights or standards C by means of pins H, fitted in apertures I formed in said uprights or standards.

To the under side of the cutter-bar D, a short distance in advance of the forward standard C, is rigidly attached the knife or cutting-blade K. This knife or cutting-blade is bent so that it extends horizontally to a point a short distance in rear of the cutter-bar D, and is then bent so as to incline downwardly and inwardly, the lower end of the cutter terminating in substantially the same vertical plane as the inner forward face of the cutter-bar. The forward edge of the cutting blade or knife is inclined so as to extend rearward from its upper to its lower end, and said inclined edge is sharpened, so that as the machine is moved forward said knife will give an upward angular cut to any stalk of corn that may be in its path.

To the inner face of the cutter-bar D is rigidly secured a block or fixed guide L, (shown more clearly in Fig. 1,) which extends forward of the inclined cutting-edge of the depending knife K.

To one side of the platform A of the machine, near the forward end thereof, is pivotally connected a longitudinal guide M, the rear end of which is attached to the forward standard C at any suitable height by any suitable means—as, for instance, a pin or bolt N, which is attached to the guide-piece M and adapted to be fitted into one of a series of apertures O formed in said standard.

The longitudinal guide M extends up above the platform A and is flared outwardly, as at *m*. From a point about its middle to near its rear end said guide is cut away, as at *n*.

A seat P is adjustably mounted on the base A, so as to be moved forward or back on said base.

The operation of my improved corn-harvester is as follows: The cutter-bar is adjusted vertically on the standards or uprights C, so as to bring the cutting-blade or knife into position to cut the corn at the desired height, and said bar is secured in such position by inserting the pins H in the proper apertures or sockets I in the standards C. The bolt or pin N is fitted into the proper socket or aperture O in the forward standard to cause the upper edge of the longitudinal guide M to contact with the lower point or end of the cutting-blade or knife. As the machine is moved forward the standing stalks of corn are brought between the cutter-bar D and guide M, and thereby compacted, so that as the machine moves the upper portions of the stalks come in contact with and are bent forward by the transverse block L, and the knife or cutting-blade K severs the stocks at the desired height from the ground. The cut stalks fall upon the platform of the machine and are caught by the attendant and bound into shocks. The depending spring-pressed finger E operates to raise stalks which may be bent down, and it serves to guide such stalks into the space between the cutter-bar D and the guide M. Should the finger E come in contact with any weed or other obstacle too strong to be raised up, it will be forced rearwardly, turning on its pivot, and remaining in such position until the machine has passed the obstacle, when the finger will be returned to its normal position by the spring F.

By changing the position of the cutter-bar with relation to the standards C the corn can be cut at any desired elevation.

I am aware that changes in the form and proportion of parts and details of construction of the devices herein shown and described as an embodiment of my invention can be made without departing from the spirit or sacrificing the advantages thereof. For example, though I have shown my machine mounted and supported on runners, I would not be understood as intending to confine myself to such construction, as wheels could and in many cases would be substituted for the runners herein shown and described. Again, though I have shown the cutter-bar as mounted and supported on two parallel uprights, and I have found this construction preferable, I may in some cases employ a single standard. I therefore reserve the right to make such changes and alterations as fairly fall within the scope of my invention.

Having thus fully described my invention, what I claim as new, and desire to secure by Letters Patent, is—

1. In a corn-harvester, the combination of a vehicle, a cutter-bar carried by said vehicle and having its outer end inclined, a guide-finger pivoted on the inclined end of the cutter-bar, a spring connected to said finger and to the cutter-bar, and a cutting-blade rigidly attached to the cutter-bar, substantially as described.

2. In a corn-harvester, the combination of a vehicle, a vertically-adjustable cutter-bar carried by said vehicle, and a cutting-blade formed from a single piece of metal and bent to form a horizontal portion, which is attached to the cutter-bar, and having a cutting-edge which inclines downwardly and rearwardly, substantially as described.

3. In a corn-harvester, the combination of a vehicle, a cutter-bar carried by said vehicle and adapted to be moved vertically thereon, a cutting-blade attached to the cutter-bar, and a transverse guide-block attached to the inner side of the cutter-bar, substantially as described.

4. In a corn-harvester, the combination of a vehicle, a perforated standard secured on said vehicle, a cutter-bar provided with a keeper which fits around the standard, a pin adapted to be secured in one of the apertures in the standard to support the cutter-bar, a cutting-blade carried by the cutter-bar, and a finger pivotally connected to the outer end of the cutter-bar, substantially as described.

5. In a corn-harvester, the combination of a vehicle, a cutter-bar carried by and adjustable vertically on said vehicle, a cutting-blade depending from the cutter-bar, a transverse guide rigidly attached to the inner side of the cutter-bar, and a longitudinal guide connected to one side of the vehicle, substantially as described.

In testimony whereof I affix my signature in presence of two witnesses.

ISAAC N. FICKES.

Witnesses:
   T. E. DEWEY,
   D. W. NAILL.